United States Patent [19]

Lyons

[11] Patent Number: 4,985,814
[45] Date of Patent: Jan. 15, 1991

[54] WARNING LIGHT WITH QUADRUPLE REFLECTIVE SURFACES

[75] Inventor: Harold W. Lyons, Killingworth, Conn.

[73] Assignee: Whelen Technologies, Inc., Chester, Conn.

[21] Appl. No.: 467,681

[22] Filed: Jan. 19, 1990

Related U.S. Application Data

[63] Continuation-in-part of Ser. No. 337,915, Apr. 14, 1989, abandoned.

[51] Int. Cl.⁵ .................................................. F21V 7/06
[52] U.S. Cl. ................................... 362/240; 362/241; 362/297; 362/346
[58] Field of Search ................. 362/61, 240, 241, 297, 362/346

[56] References Cited

U.S. PATENT DOCUMENTS

| | | | |
|---|---|---|---|
| 1,394,934 | 10/1921 | O'Neil | 362/297 |
| 1,571,714 | 2/1926 | Falge et al. | |
| 1,594,544 | 8/1926 | Michel | |
| 1,655,914 | 1/1928 | Michel | |
| 1,746,508 | 2/1930 | Wrenn et al. | 362/346 |
| 1,822,839 | 9/1931 | Brown | |
| 1,859,854 | 5/1932 | Wallstab | 362/241 |
| 1,871,505 | 8/1932 | Falge et al. | |
| 1,929,111 | 10/1933 | Falge et al. | |
| 2,253,933 | 8/1941 | Hall | 362/240 |
| 2,688,688 | 9/1954 | Holtz | |
| 2,731,544 | 1/1956 | Kayser, Sr. | |
| 4,208,704 | 6/1980 | Draper | 362/297 |
| 4,351,018 | 9/1982 | Fratty | 362/297 |
| 4,498,124 | 2/1985 | Mayer et al. | |

FOREIGN PATENT DOCUMENTS

| | | | |
|---|---|---|---|
| 573300 | 2/1958 | Italy | 362/240 |
| 110028 | 9/1925 | Switzerland | 362/241 |
| 468689 | 7/1937 | United Kingdom | 362/241 |

Primary Examiner—Stephen F. Husar
Assistant Examiner—Richard R. Cole
Attorney, Agent, or Firm—Chilton, Alix & Van Kirk

[57] ABSTRACT

A dual emitter light assembly employs a reflector having a pair of adjoining concave reflector dishes. Each dish comprises a pair of angularly related parabolic reflective surfaces. The dishes intersect along a central parabolic path which lies in a plane perpendicular to a plane defined by the parallel axes of light emitter receiving sockets which are integral with each dish.

11 Claims, 2 Drawing Sheets

WARNING LIGHT WITH QUADRUPLE REFLECTIVE SURFACES

CROSS REFERENCE TO RELATED APPLICATION

This application is a continuation-in-part of application Ser. No. 337,915 filed Apr. 14, 1989 now abandoned.

BACKGROUND OF THE INVENTION (1) Field of the Invention

The present invention relates to lights and, more particularly, warning lights having a wide angle radiation pattern, particularly in a single plane. Accordingly, the general objects of the present invention are to provide novel and improved devices of such character.

(2) Description of the Prior Art

Warning light systems which are employed on emergency vehicles, such as police cars, ambulances, fire trucks and the like, are often required to emit bursts of light which are readily visible from all sides of the vehicle. The warning lights of such systems may comprise a revolving incandescent lamp assembly, a moving mirror and cooperating lamp or a flash tube and cooperating lens and reflector. The prior art warning lights can be relatively expensive to manufacture. Additional drawbacks of many prior art warning lights is poor volumetric efficiency and high wind resistance.

A number of improved lights having particular applicability to emergency vehicle warning light systems have recently been introduced. Many such lights employ xenon flash tubes and have found wide popularity. For example, U.S. Pat. No. 4,792,717, which is assigned to the assignee of the present invention, discloses a compact wide-angle warning light. This warning light employs a concave reflector, a lens and a light emitter in the form of a specially designed xenon flash tube. The reflector comprises a linear section having parabolic side walls which are disposed between parabolic dish end sections.

In co-pending application Ser. No. 312,479 now U.S. Pat. No. 4,954,958, which is also assigned to the assignee of the present invention, a lamp assembly comprising a single light emitter, a reflector body and a lens cover which mounts over the reflector body is disclosed. The reflector body comprises a first parabolic dish-like reflector surface which forms a surface of revolution about a central axis. A mounting base projects from the first reflector surface for mounting a light emitter such as a halogen lamp or a gaseous discharge tube. The central axis extends through the emitter mounting base. A pair of reflector wings are located at equidistantly-spaced diametral positions from the central axis. The wings each define a parabolic reflector surface which has its axis canted in relation to the first reflector surface, i.e., the surfaces from which light is reflected are defined by three parabolas and these three parabolas have, to the extent manufacturing tolerances permit, a common focal point. The lens cover preferably includes a multiplicity of light spreaders which project interiorly from the cover surface. A pair of recesses are formed in the cover interior for mating with the outwardly disposed shoulder portions of the wings so as to mount the lens to the reflector body and to angularly fix the orientation of the axes of the spreaders relative to the reflector body. A source of radiation, optionally in the form of a halogen lamp or a gas discharge tube, is positioned in the envelope between the lens cover and the reflector body at the common focal point of the reflector defined parabolas and produces a generally uni-directional, wide angle beam pattern which radiates through the lens.

SUMMARY OF THE INVENTION

Briefly stated, the present invention in one embodiment is a dual emitter light assembly which comprises a reflector housing and, in many applications, a lens cover. The reflector housing comprises a pair of substantially identical laterally spaced sockets. Each of the sockets receives and supports a single point source of light and each socket is associated with a concave reflector which comprises opposing first and second parabolic reflective surfaces which are portions of different paraboloids of revolution. These paraboloids have a common focal point which is located on a central axis which extends through the socket. The axis of one of these paraboloids of revolution is canted relative to the axis of the other. Accordingly, the reflector associated with each socket is characterized by substantially coplanar non-parallel directional radiation axes.

The compound reflective surfaces of the concave reflectors are substantially identical in shape and the two reflectors are arranged in opposite, side-by-side relationship with their central axes being substantially parallel. In one embodiment, one focal axis of each reflector is canted at an angle of approximately 30° with respect to the other focal axis. The concave reflectors intersect along a well defined parabolic path which lies in a plane which is substantially transverse to the plane defined by the central axes and equidistantly spaced from these axes. Narrow transition shoulders are interposed between the first and second reflective surfaces of each reflector. The transition shoulders are substantially planar and define substantially parallel planes which are also generally transverse to the plane defined by the central axes. The sockets project axially from adjacent first reflective surfaces of the two adjacent reflectors.

A lens cover, when employed, mounts to the housing for disposition across the directional axes to distribute radiation across a wide angle in closely spaced transversely extending planes parallel to the directional axes.

In a preferred embodiment, a panel encircles the concave reflector dishes and extends generally laterally from the reflectors for mounting the light assembly. The panel also includes mounting structures for mounting the lens cover to the reflector housing. Portions of the concave reflectors extend forwardly and portions of the concave reflectors extend rearwardly relative to the panel.

An object of the invention is to provide a new and improved dual emitter warning light for an emergency vehicle.

Another object of the invention is to provide a new and improved dual emitter warning light having a wide angle radiation pattern and which is relatively inexpensive to manufacture.

Another object of the invention is to provide a new and improved dual emitter warning light which is compact while providing a high level of light intensity and a large illuminated region in relation to the physical size of the light.

A further object of the invention is to provide a new and improved dual emitter warning light which is capable of accepting either a halogen lamp or a gas discharge tube and is readily adaptable for installation on new emergency vehicles or retro-fitting on existing emergency vehicles.

Other objects and advantages of the invention will become apparent from the drawings and the specification.

DETAILED DESCRIPTION OF THE INVENTION

Figure 1:
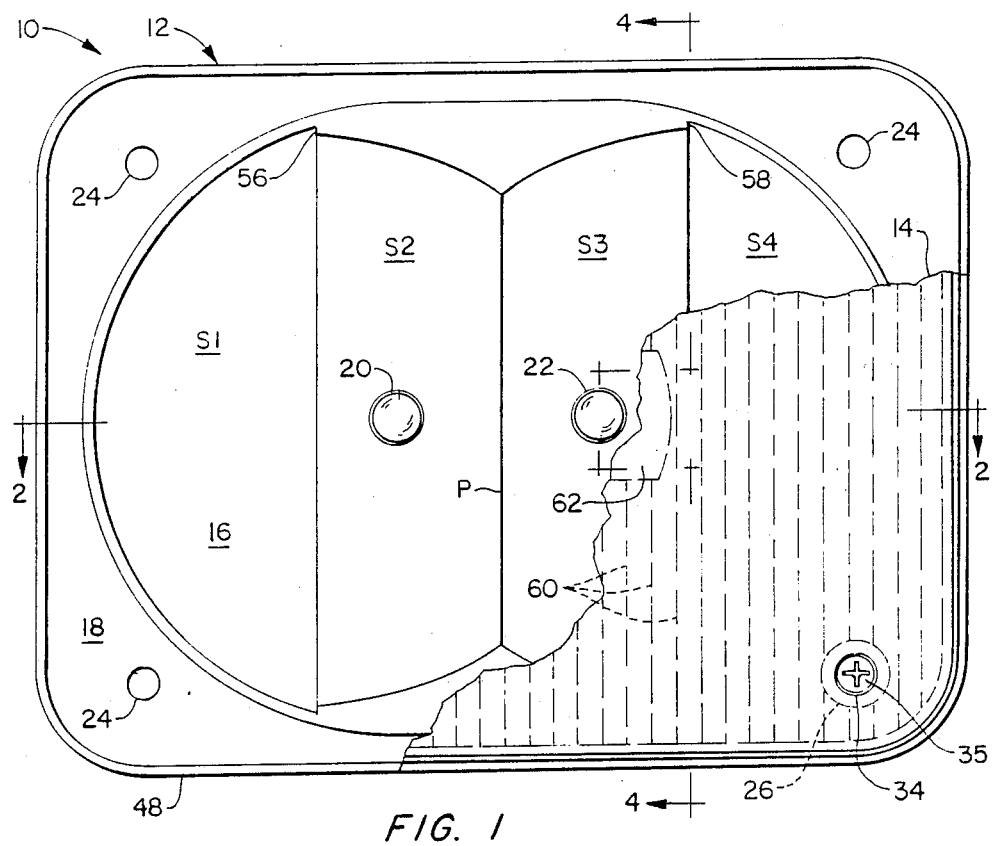
FIG. 1 is a front view, partly broken away, of a dual emitter wide angle warning light in accordance with a first embodiment of the present invention.

With reference to the drawings, wherein like numerals represent like elements throughout the Figures, a dual emitter wide angle warning light in accordance with a preferred embodiment of the present invention is generally indicated by the numeral 10. Warning light 10, in a preferred application, is flush mounted in the body of an emergency vehicle (not illustrated). For such an application, there will typically be a plurality of lights 10 which are disposed at the same height and at a predetermined spacing so as to provide a light emission pattern which is visible from all sides of the emergency vehicle.

Light 10 comprises a rear housing 12 which functions as a reflector and the principal support structure for the light. Light 10 also typically comprises a lens 14 which is adapted to be mounted on and secured to the front of the housing 12. The frontal shapes of the housing 12 and of the lens 14 have a generally rounded rectangular form. Fasteners for securing the light to the vehicle, gaskets for sealing between the light and the vehicle, and electrical connectors for electrically connecting the light with the vehicle electrical system are conventional and are not illustrated.

The housing 12 has a biconcave reflector 16 which partially extends forwardly from flanged peripheral mounting panel 18 and partially protrudes rearwardly from the panel in a dual bulbous configuration. A pair of laterally spaced sockets 20 and 22, which are adapted to receive a light emitter which is effectively a single point source of illumination, project forwardly from the reflector. The sockets 20 and 22 are substantially identical and, in the disclosed embodiment, have a generally cylindrical exterior shape which projects axially forwardly from the reflector 16. The lamp sockets 20 and 22 are adapted for mounting either a single filament incandescent lamp, a halogen filled lamp as indicated at 50 in FIG. 2 for example, or a gaseous discharge tube (not illustrated), i.e., a flash tube containing xenon gas, as may be required for a given application. The reflector housing 12 is a one piece member which is molded from a suitable thermo-plastic material. A reflective coating is applied to the front face of the housing, including the reflector 16 and exterior surfaces of the sockets 20 and 22, to provide an optically efficient reflective surface.

The flanged panel 18 of the reflector housing includes four orifices 24 disposed at corner locations. The orifices 24 are dimensioned and positioned to receive tubular projections 26 which extend inwardly from the lens 14. Each tubular projection 26 comprises a first enlarged diameter portion 28 and a second reduced diameter portion 30 which are integrally joined to define an intermediate annular shoulder 32. Upon mounting of the lens, each shoulder 32 lies in flush relationship against the surface of flange panel 18, and the reduced diameter portion 28 is received within one of the orifices 24. Each tubular projection defines a bore 34 for receiving a mounting fastener 35 for securing the lens to the housing and the warning light 10 to the vehicle.

The lens 14 has a convex face 40 and a substantially rounded rectangular peripheral shoulder 42 which is provided with a rearwardly extending lip 44. The lip 44 cooperates with the shoulder 42 to define a peripheral recess 46. The recess 46 receives a complementary peripheral lip 48 provided on the flange panel 18 of the reflector housing 12 to seat the lens onto the housing. The tubular projections 26 are integrally molded to the convex face 40 so as to define the four rearwardly longitudinally extending bores 34. The reflector housing 12 and the lens 14 are, in accordance with a preferred embodiment, permanently secured together in any suitable manner. The assembled light 10 is then mounted within an opening provided in the vehicle wall by means of fasteners 35 which are inserted into the bores 34 defined by the tubular projections.

A pair of light emitters 50 are respectively mounted in the sockets 20 and 22. Electrical leads 52 of conventional form provide the electrical connection between the light emitters and the electrical system of the vehicle. An integral bifurcated bracket 54 projects rearwardly from the reflector housing 12 for securing the leads.

The convex lens face 40 of the disclosed embodiment is provided, on its inner surface which faces the reflector 16, with a plurality of optical elements 60 which redirect incident light. These optical elements may be collimators, such as an array of prisms, or spreaders, such as are defined by arcuate shaped projections. In the case where the optical elements 60 are spreaders, these elements function to spread or distribute incident light across a wide angle. The central portion of the inwardly facing side of the lens may be provided with a planar window 62. The window 62 functions to allow radiation to pass with minimum loss in the axial direction.

Figure 2:
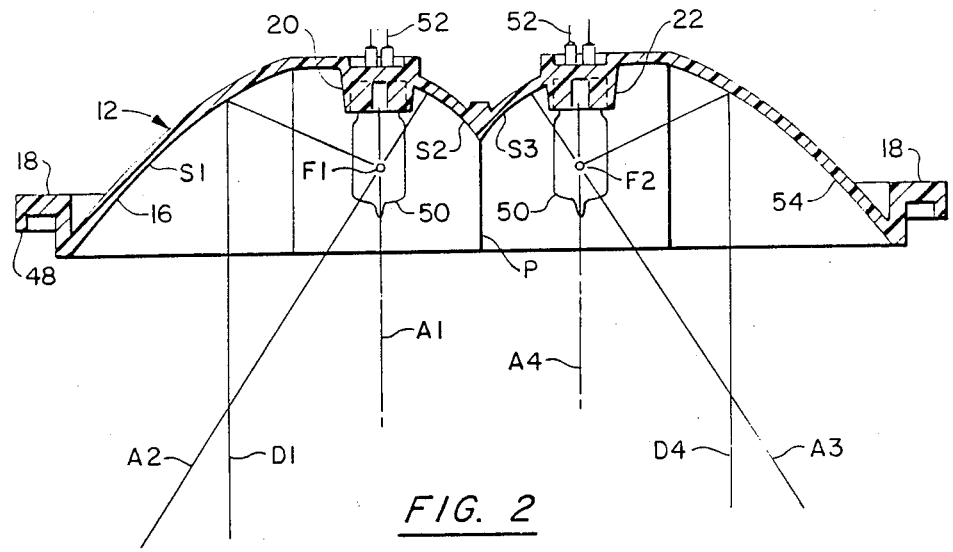
FIG. 2 is a sectional view, partly in diagrammatic form, of the reflector portion of the warning light of FIG. 1 taken along the line 2—2 of FIG. 1.
Figure 4:
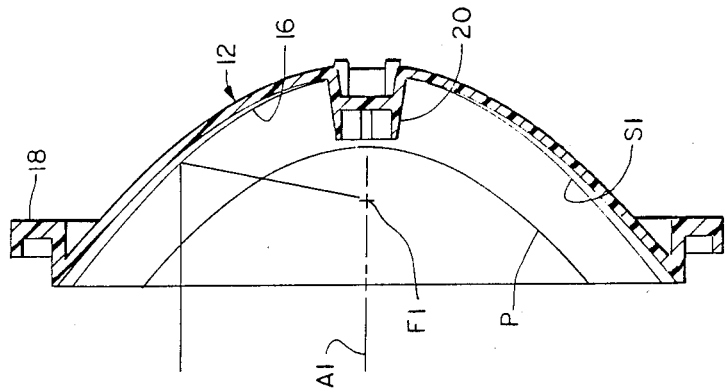
FIG. 4 is a sectional view, partly in diagrammatic form, of the reflector portion of the warning light of FIG. 1 taken along the line 4—4 of FIG. 1.
Figure 3:
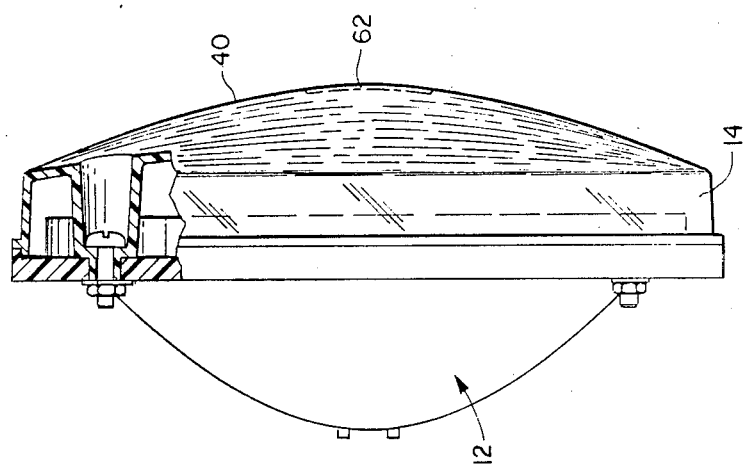
FIG. 3 is a side elevational view, partly broken away, of the warning light of FIG. 1.

With reference to FIGS. 1, 2, and 4, reflector 16 is comprised of four parabolic surfaces S1, S2, S3 and S4. Reflector surfaces S1 and S2 primarily reflect radiation produced by the light source mounted in socket 20. Reflector surfaces S3 and S4 primarily reflect radiation produced by the light source mounted in socket 22. Parabolic surfaces S1 and S4 are substantially identical in shape and are disposed in a laterally spaced generally facing relationship. Surfaces S2 and S3, which have a truncated parabolic shape, are substantially identical in shape, but are disposed in adjacent generally opposing relationship.

The parabolic reflector surfaces S1 and S2 are designed to have a common focal point F1 on axis A1 through socket 20. Axis A1 is the axis of the paraboloid of revolution which includes surface S1 while axis A2 is the axis of the paraboloid of revolution which includes surface S2. Focal point F1 also coincides with a central location of a lamp 50 mounted in socket 20, i.e., the filament of an incandescent lamp mounted in socket 20 intersects point F1. Likewise, the surfaces S3 and S4 are designed to have a common focal point F2 on axis A2 through socket 22, which focal point coincides with the source of the light generated by a lamp mounted in socket 22. The axes of revolution of the paraboloids of revolution which are defined by parabolic surfaces S2 and S3, respectively identified at A2 and A3, are respectively canted at an acute angle relative to axes A1 and A2. Surfaces S2 and S3 intersect along a well-defined parabolic path P which defines a central plane through the reflector. Plane P is substantially equidistant from axes A1 and A2 which are themselves substantially parallel. Narrow planar transition shoulders 56 and 58 (FIG. 1) extend in generally parallel relationship with and are substantially parallel to plane P, these transition shoulders being higher at the front of the reflector and decreasing in height toward an arcuate center region where the reflective surfaces S1 and S2 and the reflective surfaces S3 and S4 blend.

The parabolic surfaces S1 and S4 function in the conventional manner to focus reflected radiation from lamps 50 into beams which are projected in a direction which is parallel to transmission axes D1 and D4. Axes D1 and D4 are coplanar with axes A1 and A2. Similarly, parabolic surfaces S2 and S3 focus reflected radiation into beams which are projected in the direction of axes A2 and A3. When the lens 14 is not mounted to the reflector 16, the vicinity of the intersection of the axes A2, D1 and A3, D4 are regions of relatively high radiation intensity. It will be appreciated that when the lens 14 is mounted over the reflector 16, the generated and reflected light will be distributed across the outer face of the lens to thereby generally uniformly distribute the radiation across a relatively wide angle in a continuum of closely spaced planes which are transverse to plane P.

EXAMPLE 1

In one example of a reflector 16 in accordance with the present invention, the lateral distance between focal points F1 and F2 is 2.00 inches. The focal distance between focal point F1 and the vertex of the parabola defined by surface S2 is 0.90 inches. The axis of the paraboloid of revolution of surface S2 through point F1 is canted at angle of 30° to axis A1. The focal distance between focal point F1 and the vertex of the parabolic defined by surface S2 is 1.187 inches. The distance between the intersection of surfaces SI and S2 (transition shoulder 56) and the intersection of surfaces S3 and S4 (transition shoulder 58) is 3.68 inches.

It is to be understood that the reflector and light sources described above can be employed with a lens cover which is spatially displaced from panel 18 and/or with a cover which does not cause any redirection or focusing of the light incident thereon.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A dual emitter light assembly comprising:

reflector housing means comprising first and second laterally spaced socket means for mounting a light emitter, each said socket means having an associated concave reflector comprising first and second adjoining parabolic reflective surfaces, the parabolic reflective surfaces of each reflector having a common focal point lying on a central axis which extends through said socket means, said reflective surfaces each being a portion of a paraboloid of revolution about an axis extending between the focal point of the paraboloid and a vertex, the axis of at least one of said paraboloids of revolution being canted with respect to the axis of the paraboloid of revolution of the adjoining reflective surface so as to define substantially coplanar non-parallel directional axes of light emission of high intensity; and a light emitter mounted in each of said socket means, said light emitters comprising single substantially point sources of light and being located on said common focal point.

2. The light assembly of claim 1 wherein the first and second reflective surfaces of the reflector associated with said first socket means are respectively identical in shape to the first and second reflective surfaces of the reflector associated with said second socket means.

3. The light assembly of claim 2 wherein the concave reflector dishes intersect along a well-defined parabolic path which is substantially parallel to the central axes and equidistantly spaced therefrom.

4. The light assembly of claim 3 further comprising transition shoulders interposed between said first and second reflective surfaces of each of said reflector dishes, said shoulders being substantially planar and generally parallel to said central axes.

5. The light assembly of claim 4 wherein said socket means project axially from adjacent first reflective surfaces.

6. The light assembly of claim 1 wherein said canted paraboloid axes intersect the axis of the paraboloid of revolution of the adjacent reflective surfaces at an angle of approximately 30°.

7. The light assembly of claim 1 wherein the concave reflector dishes intersect along a well-defined parabolic path which is substantially parallel to the central axes and equidistantly spaced therefrom.

8. The light assembly of claim 1 further comprising transition shoulders interposed between said first and second reflective surfaces of each of said reflector dishes, said shoulders being substantially planar and generally parallel to said central axes.

9. The light assembly of claim 1 wherein said reflector housing means further comprises panel means for mounting said light assembly, said panel means extending generally laterally from said concave dishes and comprising means for mounting a lens cover means.

10. The light assembly of claim 9 further comprising lens cover means mountable for disposition generally forwardly from said panel means, and wherein portions of said concave dishes extend forwardly and portions of said concave dishes extend rearwardly relative to said panel means.

11. The light assembly of claim 1 wherein said socket means project axially from adjacent first reflective surfaces.

* * * * *